United States Patent
Yamamoto (10) Patent No.: US 8,505,676 B2
(45) Date of Patent: Aug. 13, 2013

(54) ELECTRIC POWER STEERING APPARATUS AND ASSEMBLY METHOD THEREFOR

(75) Inventor: Yasuharu Yamamoto, Toyota (JP)

(73) Assignee: JTEKT Corporation, Osaka-shi (JP)

( * ) Notice: Subject to any disclaimer, the term of this patent is extended or adjusted under 35 U.S.C. 154(b) by 108 days.

(21) Appl. No.: 13/185,014

(22) Filed: Jul. 18, 2011

(65) Prior Publication Data

US 2012/0018242 A1     Jan. 26, 2012

(30) Foreign Application Priority Data

Jul. 22, 2010   (JP) ................................ 2010-164746

(51) Int. Cl.
*B62D 5/04*        (2006.01)
(52) U.S. Cl.
USPC ........................................................ 180/444
(58) Field of Classification Search
USPC ........................................................ 180/444
See application file for complete search history.

(56) References Cited

U.S. PATENT DOCUMENTS

| | | | | |
|---|---|---|---|---|
| 7,191,866 B2 * | 3/2007 | Sasaki et al. | ................ | 180/444 |
| 7,278,334 B2 * | 10/2007 | Saruwatari et al. | ....... | 74/388 PS |
| 7,360,624 B2 * | 4/2008 | Nagamatsu | .................. | 180/444 |
| 7,413,052 B2 * | 8/2008 | Sasaki et al. | ................ | 180/444 |

FOREIGN PATENT DOCUMENTS

| | | |
|---|---|---|
| JP | A-2005-145431 | 6/2005 |
| JP | A-2005-329913 | 12/2005 |

* cited by examiner

*Primary Examiner* — Tony Winner
(74) *Attorney, Agent, or Firm* — Oliff & Berridge, PLC (57) ABSTRACT

An electric power steering apparatus includes a gear housing that has a pulley space in which a driven pulley, a driving pulley and a timing belt that are placed so as to be operatable and which communicates with the outside of the gear housing. The gear housing also has a motor-side hole into which a drive shaft of an electric motor is inserted, and a pulley-side hole into which the drive pulley is inserted and which is formed at a position opposite the motor-side hole across the pulley space.

7 Claims, 7 Drawing Sheets

FIG. 7
Related Art

ELECTRIC POWER STEERING APPARATUS AND ASSEMBLY METHOD THEREFOR

INCORPORATION BY REFERENCE

The disclosure of Japanese patent Application No. 2010-164746 filed on Jul. 22, 2010 including the specification, drawings and abstract is incorporated herein by reference in its entirety.

BACKGROUND OF THE INVENTION

1. Field of the Invention

The invention relates to an electric power steering apparatus that transmits assist force from an electric motor to a rack shaft via a ball screw.

2. Description of Related Art

An electric power steering apparatus that uses a ball screw is described in Japanese Patent Application Publication No. 2005-145431 (JP-A-2005-145431).

Figure 7:
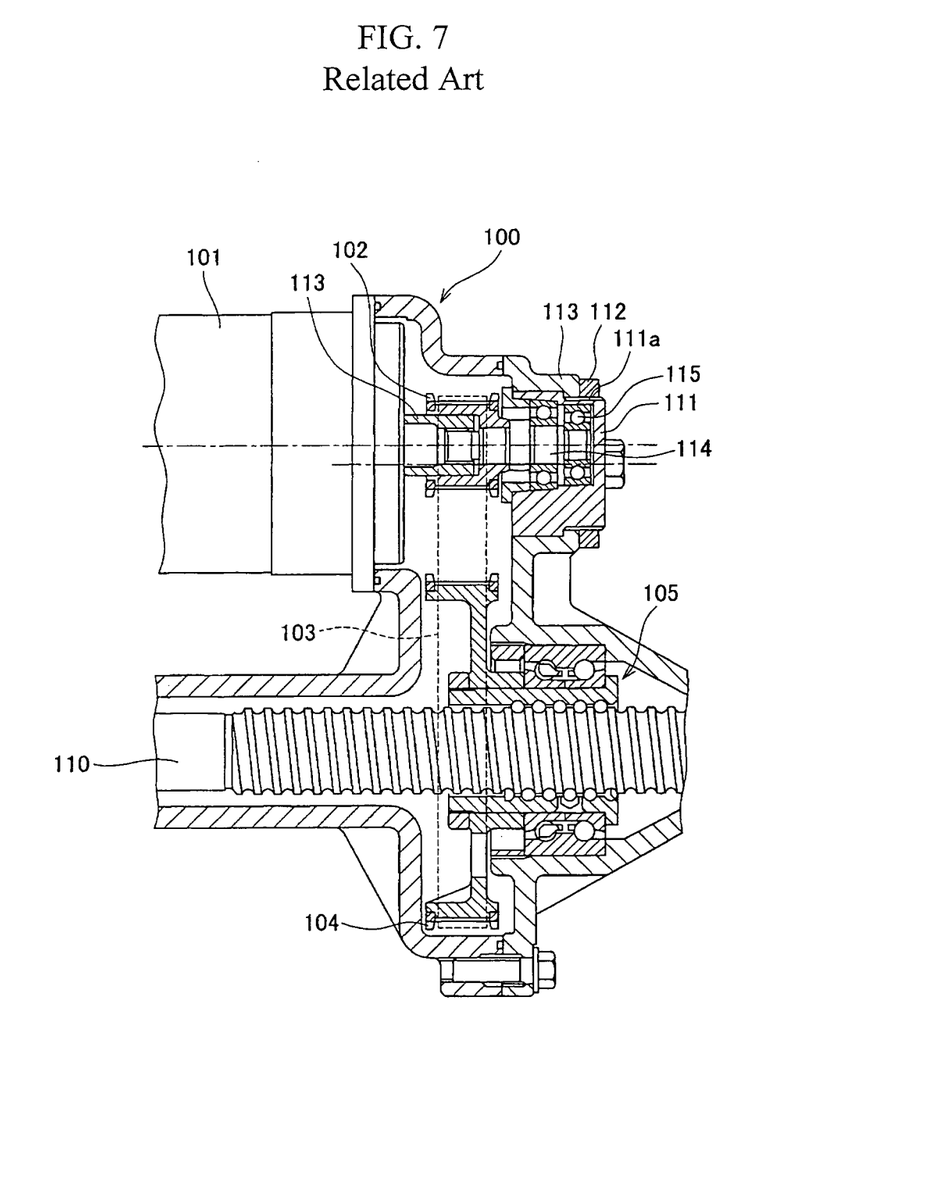
FIG. 7 is a sectional view of a related-art electric power steering apparatus.

An electric power steering apparatus 100 shown in FIG. 7 has a structure in which an assist force from an electric motor is transmitted to a rack shaft 110 via a driving pulley 102, a timing belt 103, a driven pulley 104 and a ball screw 105. Two opposite ends of the rack shaft 110 are linked to tire wheels via ball joints (not shown) so that the direction of the wheels can be changed by movement of the rack shaft 110 in the axial direction of the rack shaft 110. A steering wheel (not shown) is rotatably linked to rack teeth formed on the rack shaft 110, via a pinion shaft (not shown), so that rotation of the steering wheel is converted into movement of the rack shaft 110 in its axial direction.

In order to smoothly transmit the assist force from the electric motor 101 to the rack shaft 110, the timing belt 103 needs to be provided with an optimum belt tension. In the electric power steering apparatus 100, the driving pulley 102 is rotatably journaled to an adjustment collar 111, at a position on the adjustment collar 111 which is apart from the axial center of the adjustment collar 111. In the electric power steering apparatus 100, when the belt tension of the timing belt 103 is optimized by turning the adjustment collar 111, a locknut 112 is screwed to an external screw 111a of the adjustment collar 111. In the electric power steering apparatus 100, the adjustment collar 111 is fixed to a gear housing 113, with the angle of the adjustment collar 111 maintained.

The electric power steering apparatus 100 employs an eccentric adjustment mechanism that is made up of the adjustment collar 111, a rotating shaft 114 linked coaxially with a drive shaft 113 of the electric motor 101, a bearing 115 that rotatably supports the rotating shaft 114, and the locknut 112. Since in the electric power steering apparatus 100, the drive shaft 113 of the electric motor 101 and the rotating shaft 114 are linked together after the belt tension is adjusted, the belt tension adjustment can be easily accomplished; however, this method requires a relatively large number of component parts, resulting in a complicated structure, and therefore requires a large amount of time for the assembly.

If instead of using the foregoing eccentric adjustment mechanism, a driving pulley is attached to a drive shaft of an electric motor and then the electric motor is fixed to a gear housing while the belt tension is being adjusted, the number of component parts will be reduced, and the structure will be simplified. However, when the timing belt is to be wrapped around the driving pulley, it is necessary to incline the electric motor, which results in interference of the electric motor with the gear housing. Thus, as for this method, the efficiency of the assembling operation is low.

SUMMARY OF THE INVENTION

A first aspect of the invention relates to an electric power steering apparatus that includes: a rack shaft that has a rack tooth at an end side of the rack shaft and has a ball screw portion at another end side of the rack shaft; a gear housing in which the rack shaft is inserted so as to be movable in an axial direction; a pinion shaft which has a pinion tooth that meshes with the rack tooth, and which is journaled to the gear housing so as to be rotatable about an axis that intersects the rack shaft; a ball nut that meshes with the ball screw portion; a driven pulley that rotates together with the ball nut, and that is rotatably journaled to the gear housing; an electric motor; a driving pulley that rotates about an axis parallel to the driven pulley, and that is linked to a drive shaft of the electric motor so as to be rotated; and a timing belt wrapped around the driven pulley and the driving pulley. The electric motor is attached to the gear housing. The gear housing is provided with a pulley space in which the driven pulley, the driving pulley and the timing belt are placed so as to be operatable, and which communicates with an outside of the gear housing. The gear housing has a motor-side hole into which the drive shaft of the electric motor is inserted. A pulley-side hole into which the driving pulley is inserted into the pulley space is provided at a position in the gear housing which is opposite the motor-side hole across the pulley space.

According to the foregoing aspect of the invention, the pulley space can be accessed through both the pulley-side hole and the motor-side hole, so that the timing belt can be easily wrapped around the driving pulley, and so that the driving pulley can be easily attached to the drive shaft of the electric motor.

A second aspect of the invention relates to an electric power steering apparatus assembling method. The electric power steering apparatus assembling method includes: inserting a rack shaft into a gear housing so that the rack shaft is movable in an axial direction; forming a rack tooth on an end side of the rack shaft, and forming a ball screw portion on another end side of the rack shaft; journaling to the gear housing a pinion shaft that has a pinion tooth that meshes with the rack tooth so that the pinion shaft is rotatable about an axis that intersects the rack shaft; journaling to the gear housing a ball nut that meshes with the ball screw portion and a driven pulley that rotates together with the ball nut so that the ball nut and the driven pulley are rotatable; linking a driving pulley that rotates about an axis parallel to the driven pulley to a drive shaft of an electric motor so that the driving pulley is rotated; attaching the electric motor to the gear housing; wrapping a timing belt around the driven pulley and the driving pulley; providing the gear housing with a pulley space in which the driven pulley, the driving pulley and the timing belt are placed so as to be operatable; providing communication between the pulley space and an outside of the gear housing; providing the gear housing with a motor-side hole into which the drive shaft of the electric motor is inserted; providing a pulley-side hole into which the driving pulley is inserted, at a position in the gear housing which is opposite the motor-side hole across the pulley space; inserting the driving pulley through the pulley-side hole and wrapping the timing belt around the driving pulley; and inserting the drive shaft of the electric motor through the motor-side hole, and attaching the driving pulley to the drive shaft.

According to this aspect of the invention, after the timing belt is wrapped around the driving pulley, the driving pulley is attached to the drive shaft of the electric motor. Therefore, it is possible to attach the electric motor to the gear housing without a need to mind the interference between the electric motor and the gear housing.

According to the foregoing aspects of the invention, the pulley space can be accessed through both the pulley-side hole and the motor-side hole, so that the timing belt can be easily wrapped around the driving pulley, and so that the driving pulley can be easily attached to the drive shaft of the electric motor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
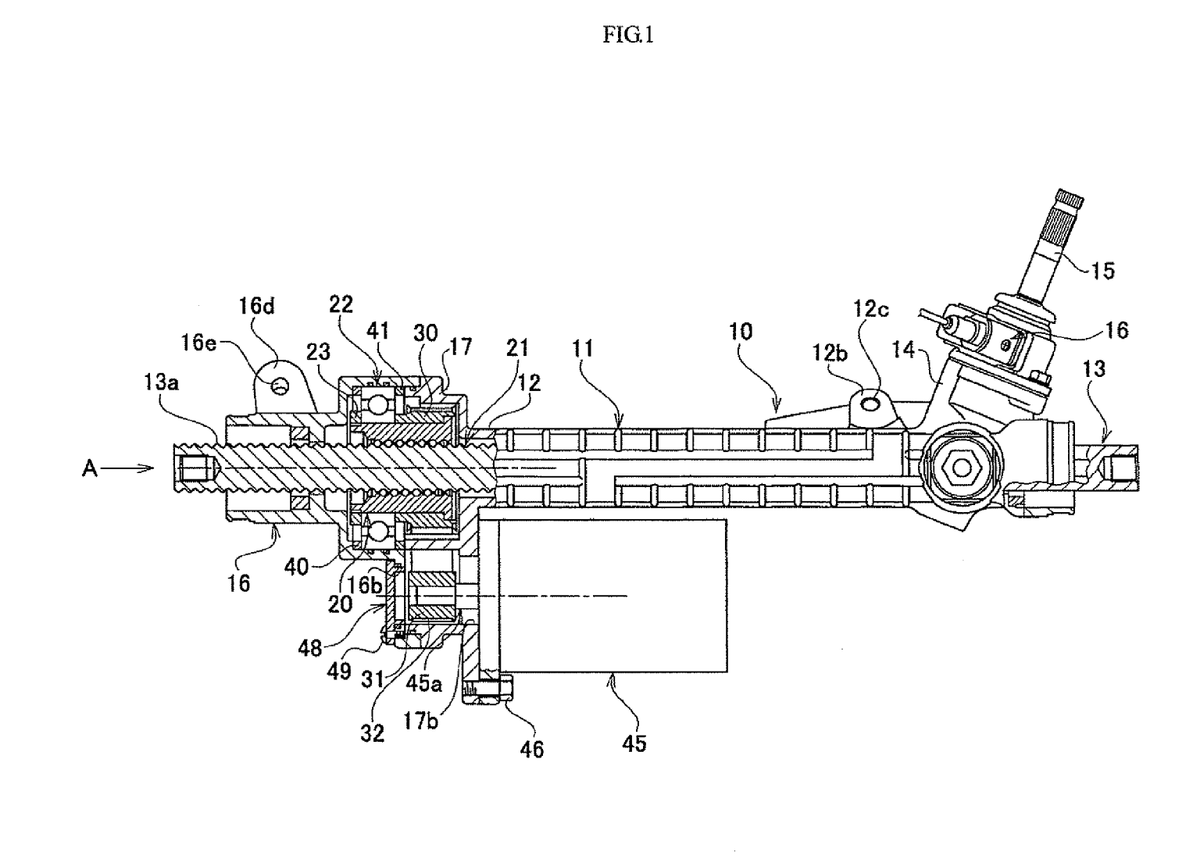
FIG. 1 is an overall construction diagram of an electric power steering apparatus in accordance with an embodiment of the invention.
Figure 2:
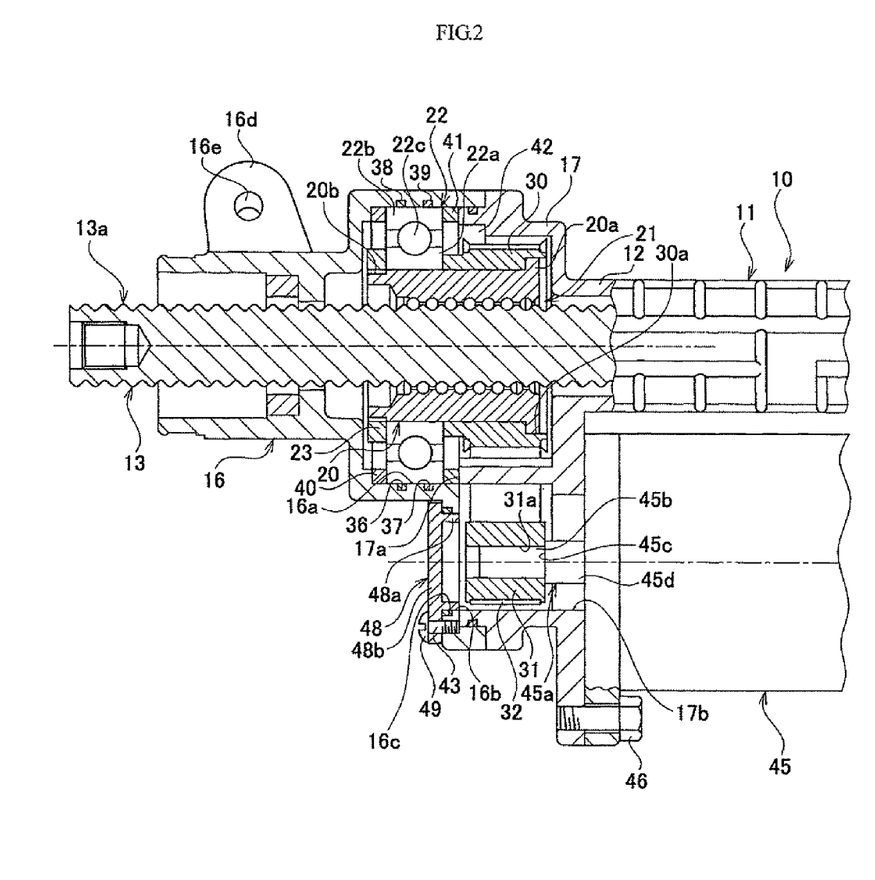
FIG. 2 is an enlarged partial sectional view showing a portion of the electric power steering apparatus of the embodiment shown in FIG. 1.
Figure 3:
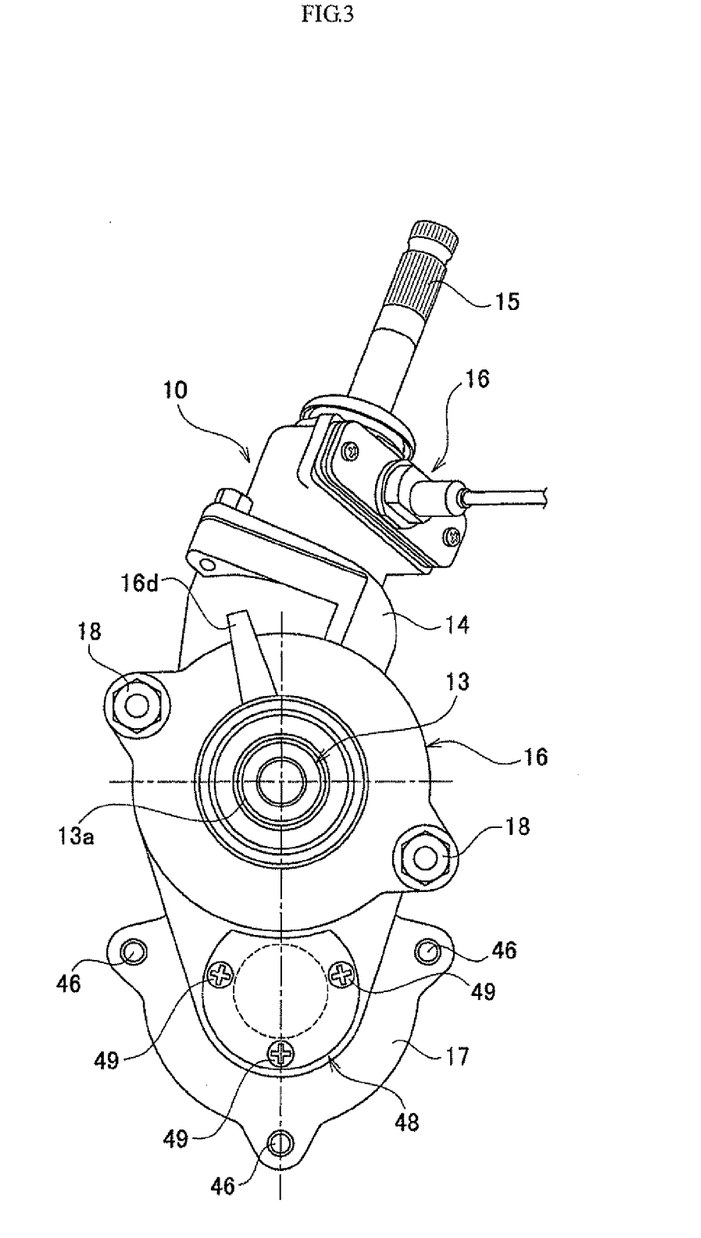
FIG. 3 is an enlarged view of the electric power steering apparatus that is taken in the direction of an arrow in FIG. 1.
Figure 4:
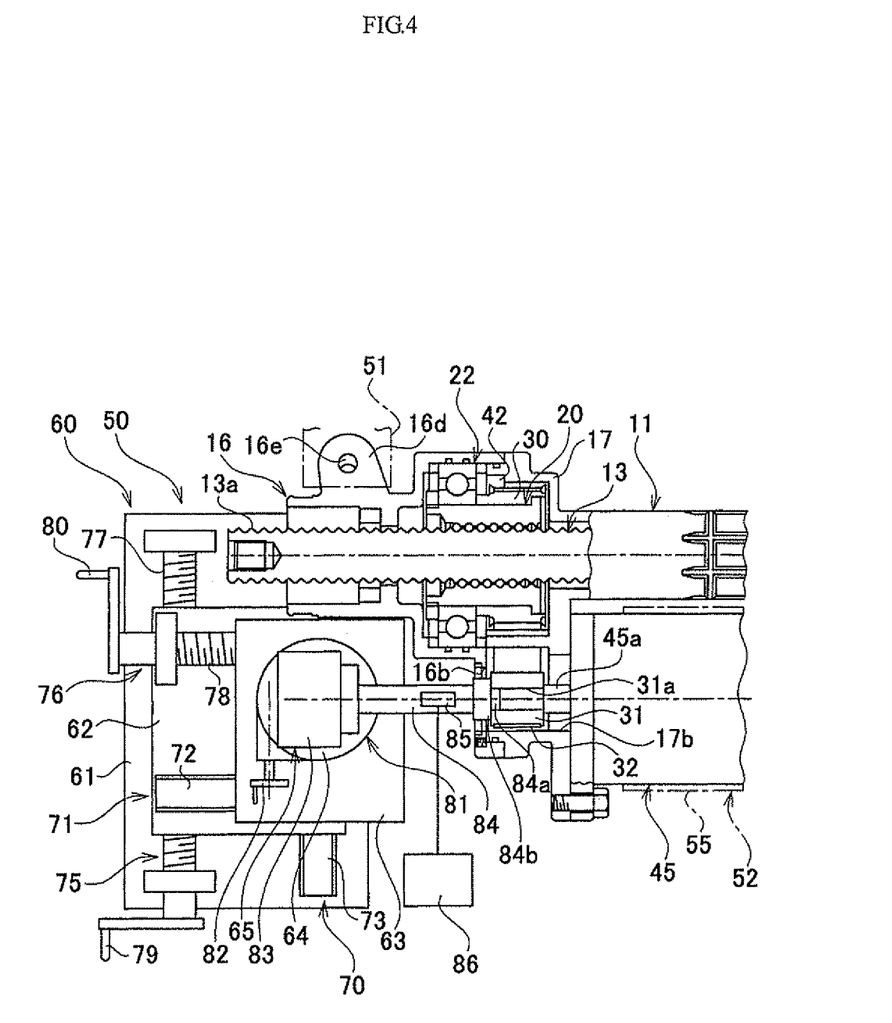
FIG. 4 is a diagram showing a state in which a driving pulley has been attached to an electric motor in the embodiment.
Figure 5:
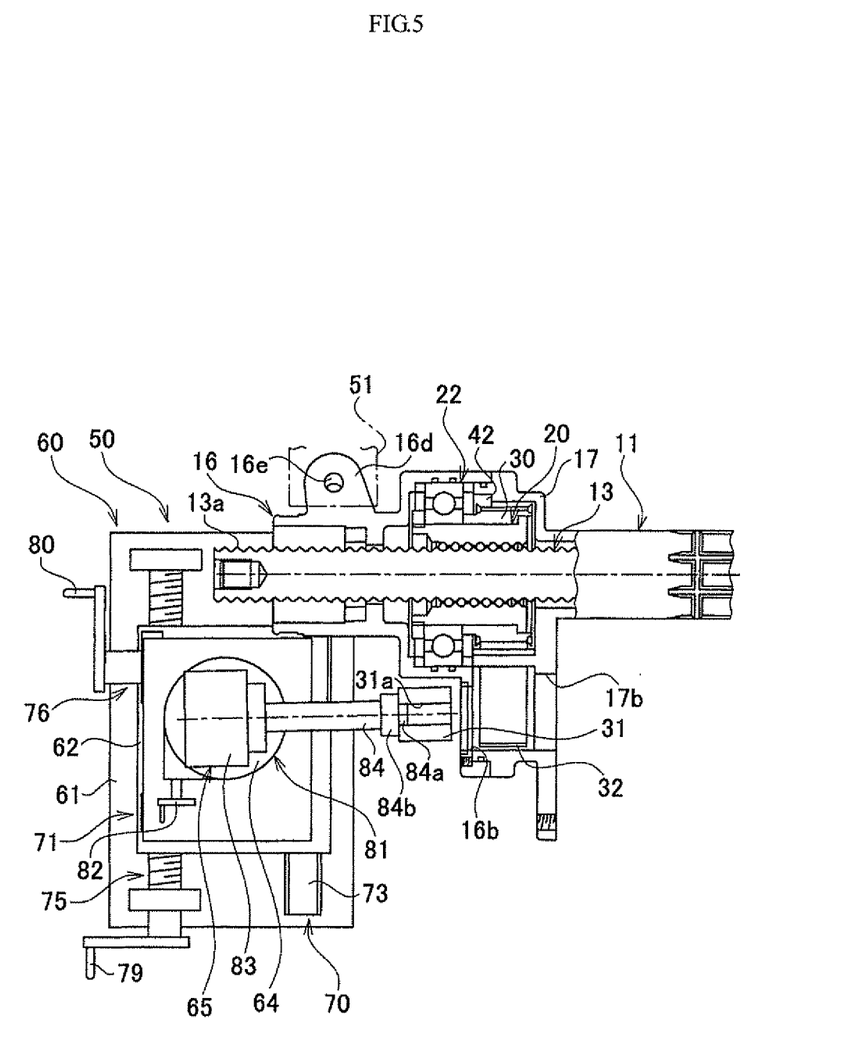
FIG. 5 is a diagram showing a state in which the driving pulley has not yet been attached to the electric motor in the embodiment.

An embodiment of the invention will be described with reference to FIGS. 1 to 5. FIG. 1 is an overall construction diagram of an electric power steering apparatus. FIG. 2 is an enlarged partial view showing a portion of the electric power steering apparatus shown in FIG. 2. FIG. 3 is an enlarged view taken in the direction of an arrow A in FIG. 1. FIG. 4 is a diagram showing a state in which a driving pulley has been attached to an electric motor. FIG. 5 is a diagram showing a state in which the driving pulley has not yet been attached to the electric motor.

Referring to FIG. 1, an electric power steering apparatus 10 has a gear housing 11, and a rack shaft 13 is inserted into a hollow cylindrical portion 12 that is formed in the gear housing 11. Each one of the two ends of the rack shaft 13 is linked to an end of a ball joint that is linked at another end thereof to a tire wheel (not shown). Thus, the direction of the wheels can be changed by moving the rack shaft 13 in the axial directions.

An end of the rack shaft 13 is provided with rack teeth that mesh with pinion teeth (not shown) of a pinion shaft 15. An end of the gear housing 11 has a gear portion 14 that extends in a direction that intersects the lengthwise direction of the gear housing 11. The pinion shaft 15 is rotatably journaled to the gear portion 14. A portion of the gear housing 11 which is opposite the pinion shaft 15 across the rack shaft 13 has a rack guide (not shown). That is, the end portion of the rack shaft 13 is supported, clamped by the pinion shaft 15 and the rack guide. An end of the pinion shaft 15 is linked to a steering wheel via a steering column (not shown). The gear portion 14 is provided with a torque sensor 19 that detects the torque that acts on the pinion shaft 15.

Another end of the rack shaft 13 is provided with a ball screw portion 13a, and a ball nut 20 is screwed to the ball screw portion 13a via many balls. The ball screw portion 13a and the ball nut 20 constitute a ball screw 21. An outer periphery of of an end of the ball nut 20 has a brim portion 20a, and an outer periphery of another end of the ball nut 20 has an external screw 20b. A driven pulley 30 and a ball bearing 22 are fitted to an external periphery of the ball nut 20, and a nut 23 is screwed to the external screw 20b. An inner periphery of the driven pulley 30 is provided with an increased-inside-diameter portion 30a whose inside diameter is increased, that is, whose inner periphery is expanded radially outward compared with other portions. The increased-inside-diameter portion 30a is in contact with the brim portion 20a of the ball nut 20. The position of the driven pulley 30 and the ball bearing 22 in the axial direction relative to the ball nut 20 is restricted because the driven pulley 30 and the ball bearing 22 are clamped by the brim portion 20a of the ball 20 and the nut 23. Due to this, the ball nut 20 is rotatable together with the riven pulley 30.

The ball bearing 22 has an inner ring 22a that is fixed to the ball nut 20, an outer ring 22b that is fitted to a support surface 16a of the lid portion 16 of the gear housing 11 (described below), and rolling elements (balls) 22a that roll between the inner ring 22a and the outer ring 22b.

Another end of the gear housing 11, that is, a ball-nut-20-side end thereof, has a support portion 17 and a lid portion 16 that are expanded radially outward. The lid portion 16 is fixed to the support portion 17 by link bolts 18. An inner periphery of the lid portion 16 is provided with the support surface 16a that is cylindrical in shape and coaxial with the rack shaft 13. The outer ring 22b of the ball bearing 22 is fitted to the cylindrical support surface 16a. A first spacer 40 is interposed between the lid portion 16 and the outer ring 22b of the ball bearing 22, and a second spacer 41 is interposed between an end surface 17a of the support portion 17 and the outer ring 22b of the ball bearing 22. The first spacer 40 and the second spacer 41 are made of rubber, and are elastically deformable.

When the lid portion 16 is fixed to the support portion 17 by the link bolts 18, the first spacer 40 and the second spacer 41 elastically deform so as to tightly contact the ball bearing 22. Due to the elastic deformation of the first spacer 40 and the second spacer 41, the outer ring 22b of the ball bearing 22 is clamped by the support portion 17 and the lid portion 16 via the first spacer 40 and the second spacer 41. The first spacer 40 and the second spacer 41 function as elastic elements that provide elastic force in the axial direction. As a result, the ball nut 20, the driven pulley 30 and the rack shaft 13 are supported with elastic force exerted thereon in the axial direction, so that the support stiffness of the rack shaft 13 in the axial direction is enhanced. As shown in FIG. 4, the support surface 16a has two annular grooves 36 and 37 into which O-rings 38 and 39 are fitted, respectively. These O-rings 38 and 39 elastically support the ball nut 20 in radial directions in such a manner as to fill the gap between the support surface 16a and the outer ring 22b.

In the support portion 17, a motor-side hole 17b is formed in parallel with the support surface 16a. An electric motor 45 is attached to the support portion 17, with a drive shaft 45a of the electric motor 45 inserted in the motor-side hole 17b. A driving pulley 31 is attached to the drive shaft 45a of the electric motor 45. A timing belt 32 is wrapped around the driven pulley 30 and the driving pulley 31. The electric motor 45 is attached to the support portion 17 by attachment bolts 46 so that the driven pulley 30 and the driving pulley 31 are parallel to each other.

The drive shaft 45a of the electric motor 45 has a small-diameter portion 45b, a step portion 45c, and a large-diameter portion 45d in that order from a distal end of the drive shaft 45a. The large-diameter portion 45d is larger in diameter than the small-diameter portion 45b. The step portion 45c is formed between the large-diameter portion 45d and the small-diameter portion 45b. The small-diameter portion 45b of the drive shaft 45a is press-fitted into a drive shaft-receiving hole 31a of the driving pulley 31 to a position such that an end surface of the driving pulley 31 contacts the step portion 45c. By this press-fitting, the driving pulley 31 is fixed to the drive shaft 45a. Because the torque of the electric motor 45 is small, the torque of the electric motor 45 does not cause the driving pulley 31 to become loose on the drive shaft 45a.

In the lid portion 16, a pulley-side hole 16b is formed at a position that corresponds to the motor-side hole 17b. That is, the motor-side hole 17b and the pulley-side hole 16b overlap at least partially with each other in the axial direction. Specifically, an outer periphery of the motor-side hole 17b aligns with an outer periphery of the pulley-side hole 16b. Between the support portion 17 and the lid portion 16, there is formed a pulley space 42 in which the driven pulley 30 and the driving pulley 31 rotate and the timing belt 32 turn with the pulleys. The pulley space 42 communicates with the outside through the motor-side hole 17b, and also communicates with the outside through the pulley-side hole 16b. An inner periphery of the pulley-side hole 16b is provided with an annular increased-inside-diameter portion 16c that is expanded radially outward. An O-ring 43 is fitted to the increased-inside-diameter portion 16c. A cap 48 that closes the pulley-side hole 16b is detachably attached to the lid portion 16 by fixture screws 49. The cap 48 is made up of a hollow cylindrical portion 48a that is fitted to the inner periphery of the pulley-side hole 16b, and a brim portion 48b that contacts an outside surface of the lid portion 16. The cap 48 prevents dust, water, etc. from entering the pulley-side hole 16b from outside, since the hollow cylindrical portion 48a and the brim portion 48b contact the O-ring 43.

In order to attach the electric power steering apparatus 10 to a vehicle body (not shown), a first attachment flange 16d is formed on an outer periphery of the lid portion 16, protruded therefrom in a radially outward direction. Besides, a second attachment flange 12b is formed on an outer periphery of the hollow cylindrical portion 12, protruded therefrom in a radially outward direction. The first attachment flange 16d has an attachment hole 16e, and the second attachment flange 12b has an attachment hole 12c.

Next, an assembling apparatus 50 for mounting the driving pulley 31 to the electric motor 45 will be described.

In FIGS. 4 and 5, the assembling apparatus 50 is made up of a first jig 51 that fixes the gear housing 11 to a predetermined position, a press-in device 52 that carries thereon the electric motor 45 and that presses the drive shaft 45a of the electric motor 45 into the driving pulley 31, and an insert device 60 that tentatively holds the driving pulley 31 and that inserts the driving pulley 31 into the pulley space 42. The first jig 51 fixes the gear housing 11 through the use of the attachment hole 16e of the first attachment flange 16d and the attachment hole 12c of the second attachment flange 12b. The press-in device 52 has a dedicated table 55 that carries thereon the electric motor 45 and that is guided movably in the axial direction of the rack shaft 13, and a cylinder device (not shown) that presses the dedicated table 55 in a direction in which the drive shaft 45a is pressed into the driving pulley 31.

The insert device 60 has a base 61, a first slider 62 that moves on the base 61 in the direction of a radius of the rack shaft 13, a second slider 63 that moves on the first slider 62 in the axial direction of the rack shaft 13, a rotation table 64 that rotates on the second slider 63, and a holder device 65 set on the rotation table. The rotation table 64 rotates about an axis that is orthogonal to the direction of movement of the first slider 62 and to the direction of movement of the second slider 63.

A first guide device 70 and a first sliding device 75 are set on the base 61. The first guide device 70 guides the first slider 62 so that the first slider 62 can be moved back and forth in the direction of a radius of the rack shaft 13, and the first sliding device 75 slides the first slider 62 in the radius direction of the rack shaft 13. On the first slider 62, a second guide device 71 and a second sliding device 76 are set. The second guide device 71 guides the second slider 63 so that the second slider 63 can be moved in back and forth the axial direction of the rack shaft 13, and the second sliding device 76 slides the second slider 63 in the axial direction of the rack shaft 13.

The first guide device 70 and the second guide device 71 are made up of rails 72 and 73, and a ball retainer that moves on the rails. The rails 72 are fixed to the base 61, and the rails 73 are fixed to the first slider 62. The ball retainer is fixed to the first slider 62 and the second slider 63. The first sliding device 75 and the second sliding device 76 are made up of ball screws 77 and 78, ball nuts (not shown) that are screwed to the ball screw, and a first handle 79 and a second handle 80 that rotate integrally with the ball screws 77 and 78, respectively. The ball screw 77 is rotatably supported on the base 61, and the ball screw 78 is rotatably supported on the first slider 62. The ball nut is fixed to the first slider 62 and to the second slider 63.

A rotation device 81 is set on the second slider 63. The rotation device 81 includes the rotation table 64. The rotation device 81 has a rotation guide device (not shown) and a rotary sliding device (not shown). The rotation guide device guides the rotation table 64 so that the rotation table 64 is rotatable. The rotary sliding device rotates the rotation table 64. The rotary sliding device has a worm (not shown), a worm wheel (not shown), and a third handle 82 that rotates together with the worm. As the third handle 82 is turned, the rotation table 64 rotates.

The holder device 65 has a holding table 83 that is fixed to the rotation table 64, and a holding tool 84 that is detachably attached to the holding table 83. A distal end of the holding tool 84 is provided with a hollow cylindrical portion 84a, and a brim portion 84b that is expanded radially outward. The hollow cylindrical portion 84a has such an outside diameter as to be easily pressed into the drive shaft-receiving hole 31a of the driving pulley 31. The brim portion 84b contacts an end surface of the driving pulley 31.

A strain gauge 85 that detects the deflection of the holding tool 84 is attached to the holding tool 84. A signal from the strain gauge 85 is input to a monitor 86. Due to the strain gauge 85 and the monitor 86, it is possible to monitor the belt tension applied to the timing belt 32 on the basis of the deflection of the holding tool 84.

Subsequently, an operation of assembling the electric power steering apparatus will be described on the basis of the foregoing construction.

The ball bearing 22 and the driven pulley 30 are mounted to the ball nut 20, and the timing belt 32 wrapped around the driven pulley 30. The first spacer 40, the ball bearing 22 and the second spacer 41 are fitted to the support surface 16a of the lid portion 16. The lid portion 16 is linked to the support portion 17 via the link bolts 18.

The electric power steering apparatus 10 assembled to the above-described state is attached to the first jig 51. Next, the drive shaft-receiving hole 31a of the driving pulley 31 is lightly pressed over the hollow cylindrical portion 84a of the holding tool 84 until the end surface of the driving pulley 31 contacts the brim portion 84b of the holding tool 84.

Subsequently, the third handle 82 is turned to rotate the rotation table 64 together with the holder device 65. The rotation table 64 is rotated to a state that immediately precedes the insertion of the driving pulley 31 into the pulley-side hole 16b so that the axis of the holding tool 84 is inclined relative to the axis of the rack shaft 13. The first handle 79 is turned to move the first slider 62 so that the driving pulley 31 substantially meet the pulley-side hole 16b. The second handle 80 is turned to move the second slider 63 so that the driving pulley 31 is inserted through the pulley-side hole 16b into the pulley space 42. In this insertion process, the timing belt 32 is wrapped around the driving pulley 31. The third handle 82 is turned in the direction opposite to the direction in which the third handle 82 was turned before. The rotation table 64 and the holder device 65 are thus rotated until the axis of the holding tool 84 becomes parallel to the axis of the rack shaft 13. The first handle 79 is turned to move the second slider 63 together with the holder device 65 in such a direction that the driving pulley 31 moves away from the driven pulley 30. While the belt tension disposed in the monitor 86 is watched, the movement of the second slider 63 is stopped when a predetermined belt tension is reached. Then, the position of the second slider 63 is maintained.

The dedicated table 55 carrying thereon the electric motor 45 is moved toward the insert device 60. The movement of the dedicated table 55 is stopped immediately before the drive shaft 45a of the electric motor 45 is inserted into the drive shaft-receiving hole 31a of the driving pulley 31. The position of the electric motor 45 is finely adjusted in the radius direction of the rack shaft 13, relative to the dedicated table 55, until the position of the electric motor 45 reaches a position such that the drive shaft 45a of the electric motor 45 substantially meets the drive shaft-receiving hole 31a. The dedicated table 55 is moved again so that the small-diameter portion 45b of the drive shaft 45a is pressed into the drive shaft-receiving hole 31a of the driving pulley 31. This pressed insertion is completed as the step portion 45c of the drive shaft 45a contacts the end surface of the driving pulley 31. While this state is maintained, the electric motor 45 is attached to the support portion 17 via the attachment bolts 46. Thus, the electric motor 45 can be attached to the support portion 17, with the predetermined belt tension applied to the timing belt 32.

Then, the second handle 80 is turned in the direction opposite to the direction in which the second handle 80 was turned before, so as to move the second slider 63 together with the holder device 65 in such a direction that the second slider 63 moves away from the press-in device 52. Then, the hollow cylindrical portion 84a of the holding tool 84 is pulled out from the drive shaft-receiving hole 31a of the driving pulley 31, and furthermore the hollow cylindrical portion 84a of the holding tool 84 is pulled out from the pulley-side hole 16b. The cap 48 is fitted to the pulley-side hole 16b, and the cap 48 is fixed to the lid 16 via the fixture screws 49. The electric power steering apparatus 10 is detached from the first jig 51. Thus, the mounting of the driving pulley 31 and the electric motor 45 to the electric power steering apparatus 10 is completed.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

In the foregoing embodiment, the timing belt 32 is hooked by the driving pulley 31 so as to wrap around the driving pulley 31 while the driving pulley 31 is inclined relative to the axis of the rack shaft 13. However, as in another embodiment shown in FIG. 6, the driving pulley 31 may be kept parallel to the axis of the rack shaft 13, instead of being inclined, and the driving pulley 31 may be shifted to the driven pulley 30 side so that the driven pulley 30 is nearly inserted into the pulley-side hole 16b. While this state is maintained, the driving pulley 31 is inserted into the pulley space 42 through the pulley-side hole 16b. Then, the driving pulley 31 may be moved in a direction away from the driven pulley 30 so that the timing belt 32 is wrapped around the driving pulley 31.

Figure 6:
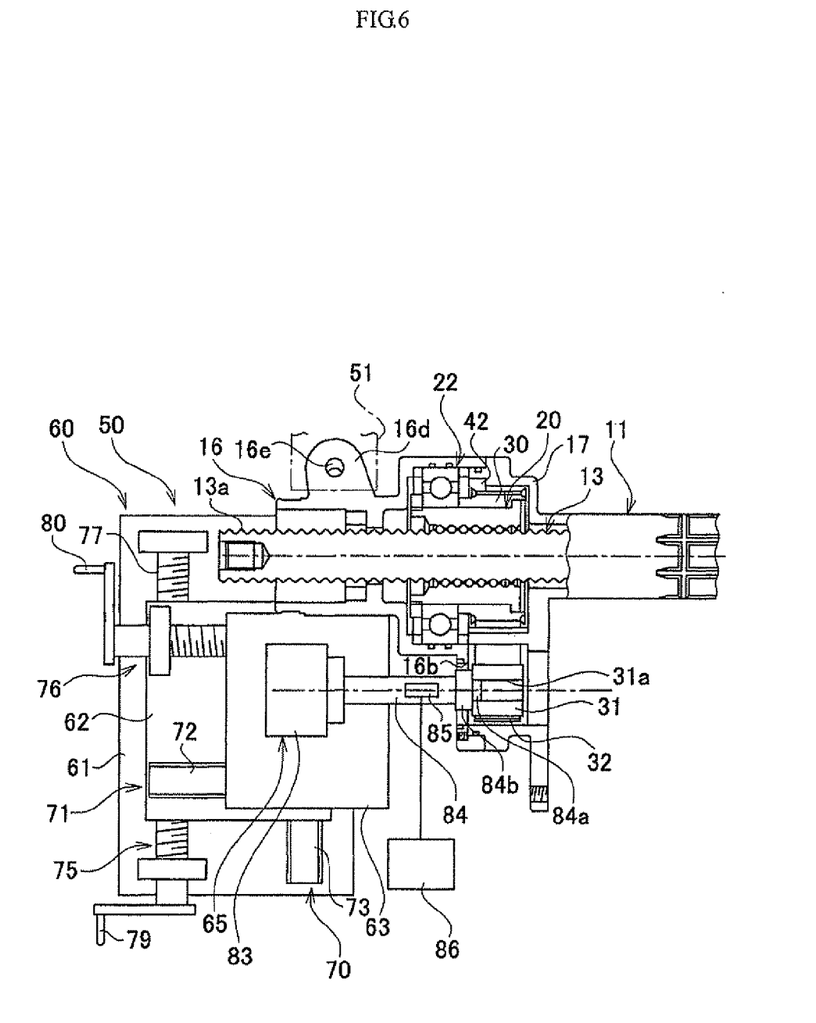
FIG. 6 is a diagram showing a state in which the driving pulley has not yet been attached to the electric motor in another embodiment of the invention.

An operation that is performed in the foregoing case will be described. The first handle 79 is turned to move the second slider 63 and the holder device 65 in the direction of a radius of the rack shaft 13 so that the position of the driving pulley 31 is adjusted to a position that is shifted to the driven pulley 30 side so that the driving pulley 31 is nearly inserted into the pulley-side hole 16b. Next, the second handle 80 is turned to move the first slider 62 together with the holder device 65 to the press-in device 52 side so that the driving pulley 31 is inserted into the pulley space 42. Subsequently, the first handle 79 is turned to move the second slider 63 and the holder device 65 in the radius direction of the rack shaft 13 so that the driving pulley 31 is moved in a direction away from the driven pulley 30 and therefore the timing belt 32 is wrapped around the driving pulley 31. Then, while the belt tension disposed in the monitor 86 is watched, the second slider 63 is moved until a predetermined belt tension is obtained. At this time, the movement of the second slider 63 is stopped, and the position of the second slider 63 is maintained.

The dedicated table 55 carrying thereon the electric motor 45 is moved toward the insert device 60. Then, the movement of the dedicated table 55 is stopped immediately before the drive shaft 45a of the electric motor 45 is inserted into the drive shaft-receiving hole 31a of the driving pulley 31. The position of the electric motor 45 relative to the dedicated table 55 is finely adjusted in the radius direction of the rack shaft 13 to such a position that the drive shaft 45a of the electric motor 45 corresponds to or faces the drive shaft-receiving hole 31a. Then, the dedicated table 55 is moved again so that the small-diameter portion 45b of the drive shaft 45a is pressed into the drive shaft-receiving hole 31a of the driving pulley 31. This pressed insertion of the small-diameter portion 45b is completed as the step portion 45c of the drive shaft 45a contacts the end surface of the driving pulley 31. While this state is maintained, the electric motor 45 is attached to the support portion 17 via the attachment bolts 46.

In the foregoing another embodiment, since there is no need to incline the driving pulley 31, the need for the rotation device 81 is eliminated.

In the foregoing embodiments, belt tension is applied to the timing belt 32 by the insert device 60, and while this state is maintained, the driving pulley 31 is transferred from the holding tool 84 to the drive shaft 45a of the electric motor 45. However, the driving pulley 31 may also be transferred from the holding tool 84 to the drive shaft 45a without applying belt tension to the timing belt 32. After that, belt tension may be applied to the timing belt 32 by moving the electric motor 45 in the radius direction of the rack shaft 13. While this state is maintained, the electric motor 45 may be fixed to the support portion 17.

What is claimed is:

1. An electric power steering apparatus comprising:
a rack shaft that has a rack tooth at an end side of the rack shaft and has a ball screw portion at another end side of the rack shaft;
a gear housing in which the rack shaft is inserted so as to be movable in an axial direction;
a pinion shaft which has a pinion tooth that meshes with the rack tooth, and which is journaled to the gear housing so as to be rotatable about an axis that intersects the rack shaft;
a ball nut that meshes with the ball screw portion;
a driven pulley that rotates together with the ball nut, and that is rotatably journaled to the gear housing;
an electric motor;
a driving pulley that rotates about an axis parallel to the driven pulley, and that is linked to a drive shaft of the electric motor so as to be rotated; and
a timing belt wrapped around the driven pulley and the driving pulley,
wherein the electric motor is attached to the gear housing, and
wherein the gear housing is provided with a pulley space in which the driven pulley, the driving pulley and the timing belt are placed so as to be operable, and which communicates with an outside of the gear housing, and
wherein the gear housing has a motor-side hole into which the drive shaft of the electric motor is inserted, and
wherein a pulley-side hole into which the driving pulley is inserted into the pulley space is provided at a position in the gear housing which is opposite the motor-side hole across the pulley space.

2. The electric power steering apparatus according to claim 1, further comprising a cap that is fitted to an inner periphery of the pulley-side hole and closes the pulley-side hole.

3. The electric power steering apparatus according to claim 1, wherein the motor-side hole and the pulley-side hole overlap at least partially with each other.

4. The electric power steering apparatus according to claim 3, wherein an outer periphery of the motor-side hole aligns with an outer periphery of the pulley-side hole.

5. The electric power steering apparatus according to claim 2, wherein the motor-side hole and the pulley-side hole overlap at least partially with each other.

6. An electric power steering apparatus assembling method comprising the steps of:

inserting a rack shaft into a gear housing so that the rack shaft is movable in an axial direction, the rack shaft having a rack tooth on a first end of the rack shaft, and a ball screw portion on a second end of the rack shaft;

journaling to the gear housing a pinion shaft that has a pinion tooth that meshes with the rack tooth so that the pinion shaft is rotatable about an axis that intersects the rack shaft;

journaling to the gear housing a ball nut that meshes with the ball screw portion and a driven pulley that rotates together with the ball nut so that the ball nut and the driven pulley are rotatable;

linking a driving pulley that rotates about an axis parallel to the driven pulley to a drive shaft of an electric motor so that the driving pulley is rotated;

attaching the electric motor to the gear housing;

wrapping a timing belt around the driven pulley and the driving pulley;

providing the gear housing with a pulley space in which the driven pulley, the driving pulley and the timing belt are placed so as to be operable;

providing communication between the pulley space and an outside of the gear housing;

providing the gear housing with a motor-side hole into which the drive shaft of the electric motor is inserted;

providing a pulley-side hole into which the driving pulley is inserted, at a position in the gear housing which is opposite the motor-side hole across the pulley space;

inserting the driving pulley through the pulley-side hole and wrapping the timing belt around the driving pulley; and inserting the drive shaft of the electric motor through the motor-side hole, and attaching the driving pulley to the drive shaft.

7. The electric power steering apparatus assembling method according to claim 6, wherein the driving pulley has a drive shaft-receiving hole into which the drive shaft of the electric motor is inserted, the assembling method further comprising:

preparing a holding tool that is inserted into the drive shaft-receiving hole and that holds the driving pulley;

inserting the driving pulley through the pulley-side hole by using the holding tool; and wrapping the timing belt around the driving pulley.

* * * * *